(12) United States Patent
Yoo et al.

(10) Patent No.: US 10,579,564 B2
(45) Date of Patent: *Mar. 3, 2020

(54) SYSTEM ON CHIP (SOC), MOBILE ELECTRONIC DEVICE INCLUDING THE SAME, AND METHOD OF OPERATING THE SOC

(71) Applicant: SAMSUNG ELECTRONICS CO., LTD., Suwon-si, Gyeonggi-do (KR)

(72) Inventors: Jun Hee Yoo, Yongin-si (KR); Jae Geun Yun, Hwaseong-si (KR); Bub Chul Jeong, Yongin-si (KR); Dong Soo Kang, Hwaseong-si (KR); Kyeo Rae Lee, Anyang-si (KR); Seong Min Jo, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,621

(22) Filed: Feb. 12, 2019

(65) Prior Publication Data

US 2019/0171597 A1 Jun. 6, 2019

Related U.S. Application Data

(63) Continuation of application No. 15/989,539, filed on May 25, 2018, now Pat. No. 10,229,079, which is a (Continued)

(30) Foreign Application Priority Data

Dec. 9, 2014 (KR) .................. 10-2014-0175966

(51) Int. Cl.
*G06F 13/00* (2006.01)
*G06F 13/368* (2006.01)
(Continued)

(52) U.S. Cl.
CPC ........ *G06F 13/368* (2013.01); *G06F 13/4068* (2013.01); *G06F 13/1621* (2013.01); *Y02D 10/14* (2018.01); *Y02D 10/151* (2018.01)

(58) Field of Classification Search
CPC .......................... G06F 13/368; G06F 13/1621
See application file for complete search history.

(56) References Cited

U.S. PATENT DOCUMENTS

| 7,346,723 B2 | 3/2008 | Kim et al. |
| 8,402,295 B2 | 3/2013 | Bhoj |

(Continued)

FOREIGN PATENT DOCUMENTS

| JP | 2008-305215 | 12/2006 |
| JP | 2010-021793 | 1/2010 |

OTHER PUBLICATIONS

Notice of Allowance dated Oct. 25, 2018 in corresponding U.S. Appl. No. 15/989,539.

*Primary Examiner* — Tammara R Peyton
(74) *Attorney, Agent, or Firm* — F. Chau & Associates, LLC

(57) ABSTRACT

A system on chip (SoC) is present that includes a plurality of master interfaces, a plurality of slave interfaces, and an interface circuit which is connected between the plurality of master interfaces and the plurality of slave interfaces and includes a plurality of components. When a first master interface among the plurality of master interfaces and a first slave interface among the plurality of slave interfaces are paired, a first group of the components which forms a first signal path between the first master interface and the first slave interface among the plurality of components is enabled according to a control of the first master interface.

18 Claims, 13 Drawing Sheets

Related U.S. Application Data continuation of application No. 14/962,373, filed on Dec. 8, 2015, now Pat. No. 9,984,019.

(51) Int. Cl.
  *G06F 13/40* (2006.01)
  *G06F 13/16* (2006.01)

(56) References Cited

U.S. PATENT DOCUMENTS

| | | |
|---|---|---|
| 9,367,499 B2 * | 6/2016 | Yun .................... G06F 13/4022 |
| 9,411,771 B2 | 8/2016 | Huang |
| 9,984,019 B2 * | 5/2018 | Yoo ........................ G06F 13/368 |
| 10,185,684 B2 * | 1/2019 | Yoo ........................ G06F 13/364 |
| 10,229,079 B2 * | 3/2019 | Yoo ........................ G06F 13/368 |
| 2007/0162648 A1 | 7/2007 | Tousek |
| 2008/0028226 A1 | 1/2008 | Brocker et al. |
| 2011/0202788 A1 | 8/2011 | Hesse et al. |
| 2011/0271134 A1 | 11/2011 | Hofmann |
| 2013/0031284 A1 | 1/2013 | Yun et al. |
| 2013/0117593 A1 | 5/2013 | Nooney et al. |
| 2013/0124907 A1 | 5/2013 | Aoki |
| 2014/0053008 A1 | 2/2014 | Rozas |
| 2014/0079073 A1 | 3/2014 | Kadu et al. |
| 2018/0276160 A1 | 9/2018 | Yoo et al. |

\* cited by examiner

FIG. 6A

| | 119A | 119B | | | | 119C |
|---|---|---|---|---|---|---|
| | REQ | 131-1 | 131-2 | 131-3 | 131-4 | SI_1 |
| | REQ1 | 131-1 | 131-2 | 131-3 | 131-8 | SI_2 |

| | 119A | 119B | | | | 119C | |
|---|---|---|---|---|---|---|---|
| | REQ | 131-1 | 131-2 | 131-3 | 131-4 | SI_1 | ⇒ ERASE |
| | REQ1 | 131-1 | 131-2 | 131-3 | 131-8 | SI_2 | |

118

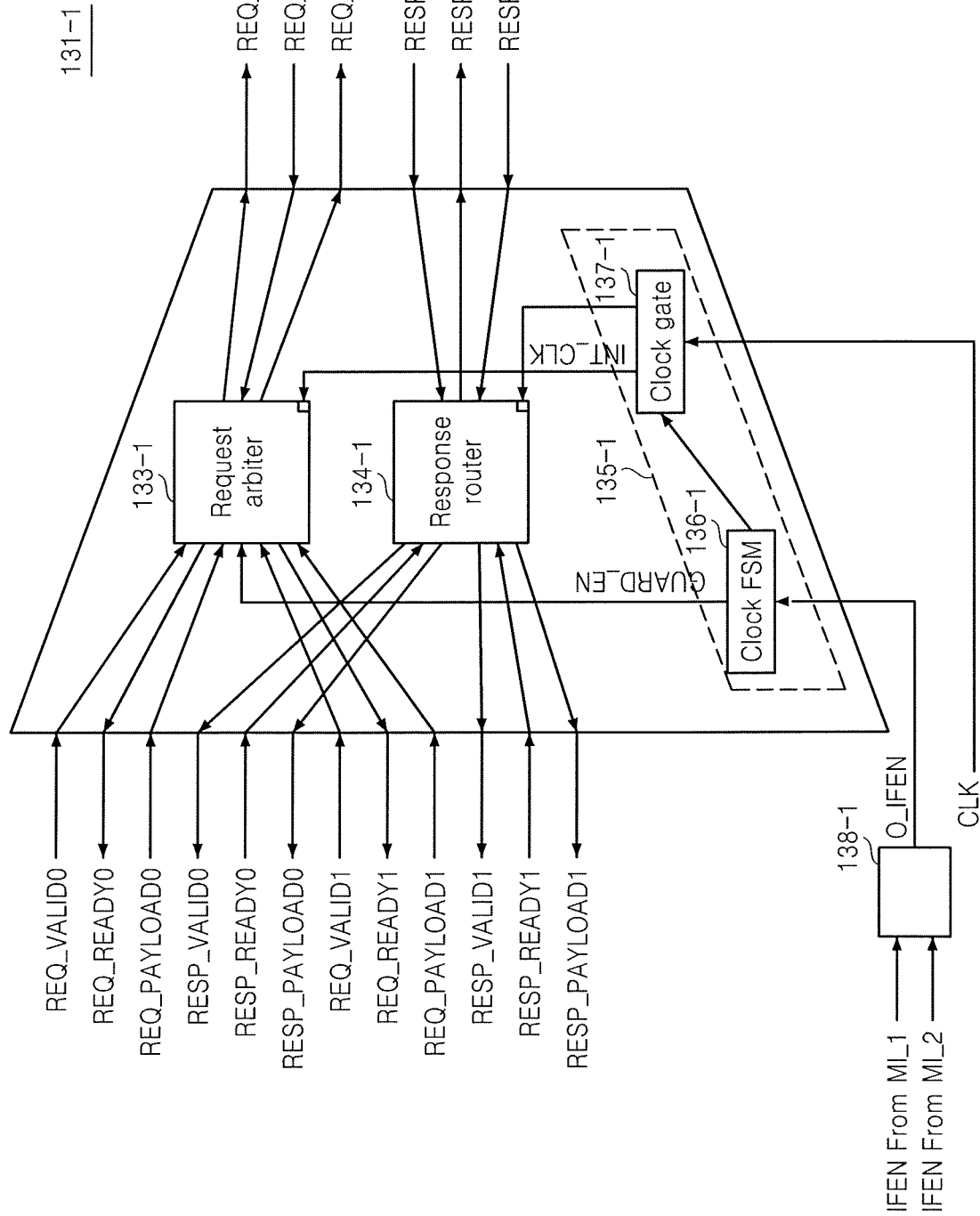

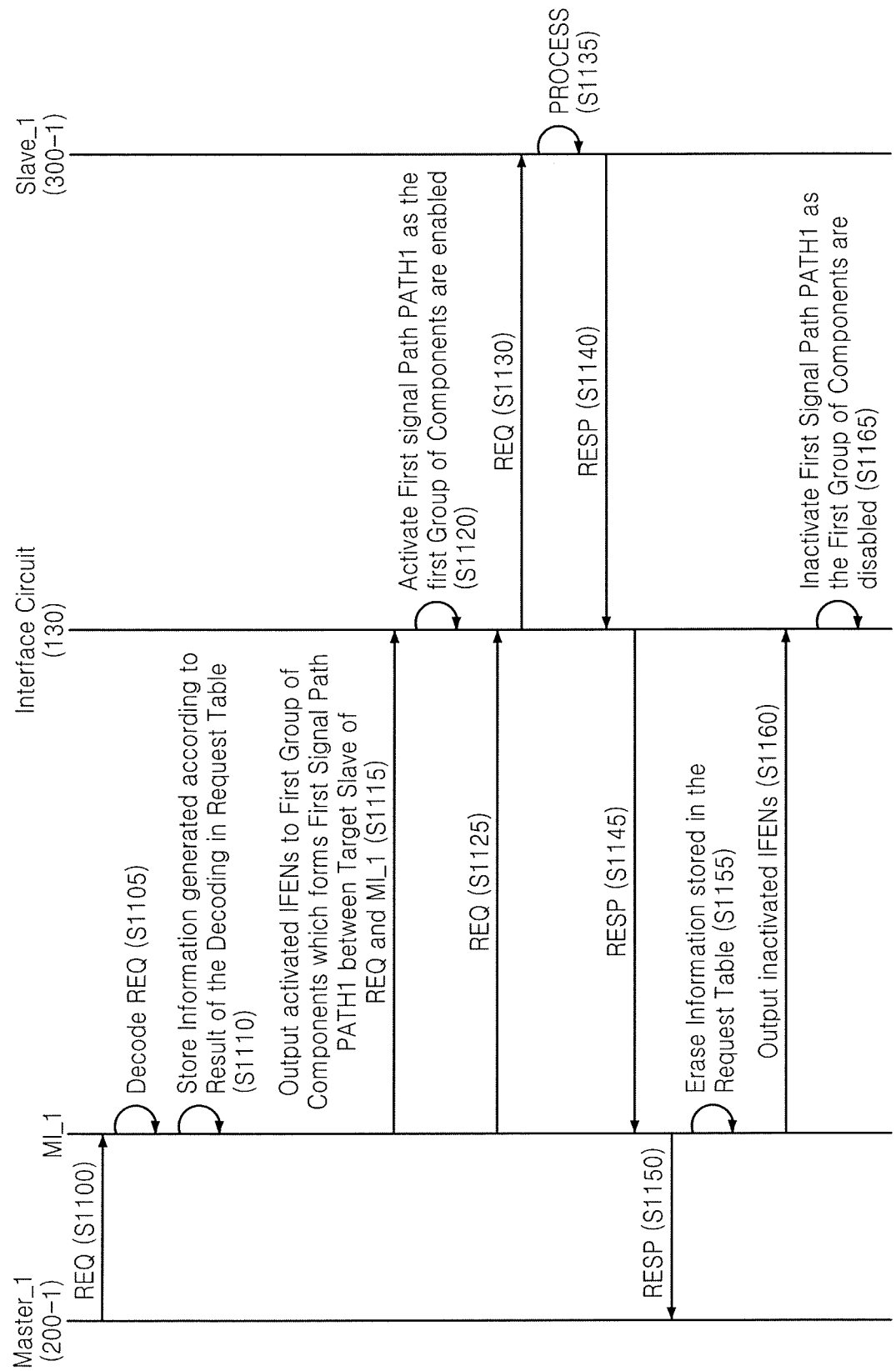

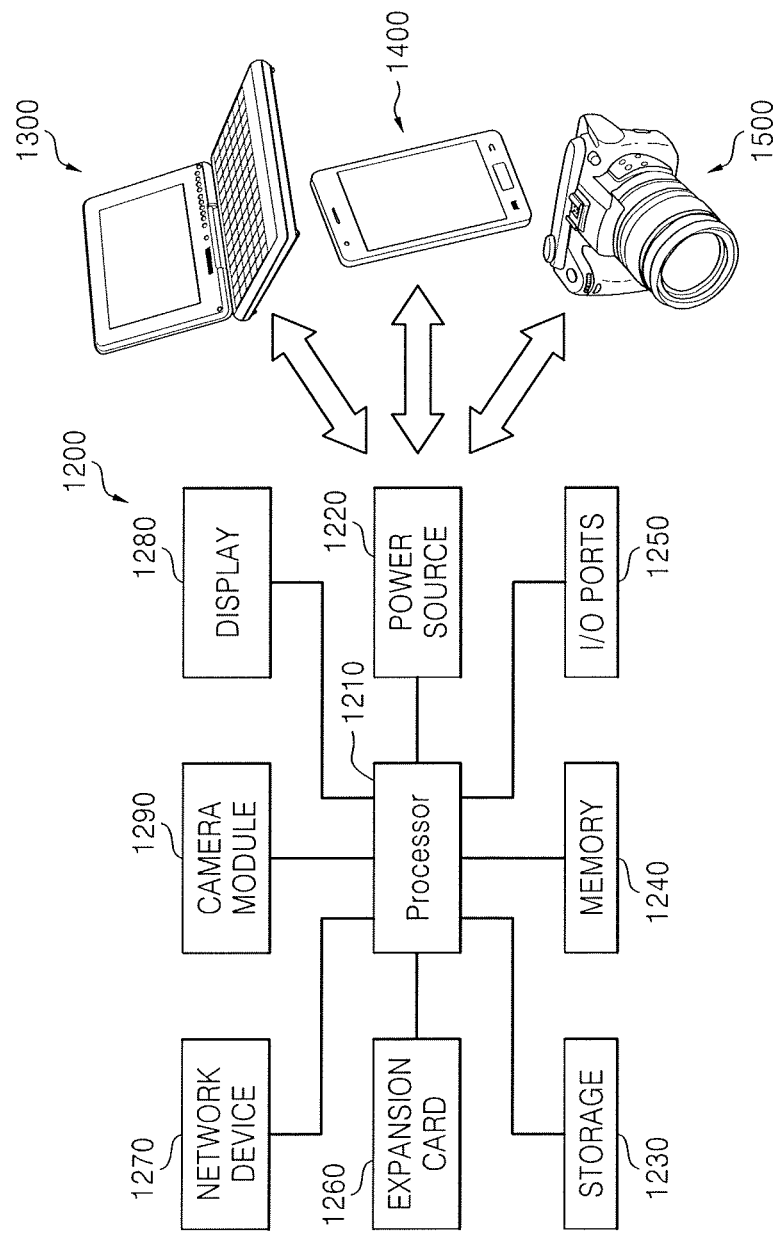

SYSTEM ON CHIP (SOC), MOBILE ELECTRONIC DEVICE INCLUDING THE SAME, AND METHOD OF OPERATING THE SOC

CROSS-REFERENCE TO RELATED APPLICATIONS

This application is a continuation application of U.S. application Ser. No. 15/989,539 filed May 25, 2018, which is a continuation application of U.S. application Ser. No. 14/962,373 filed Dec. 8, 2015, which issued as U.S. Pat. No. 9,984,019 on May 29, 2018, which claims priority under 35 U.S.C. § 119(a) to Korean Patent Application No. 10-2014-0175966 filed on Dec. 9, 2014, the disclosures of which are incorporated by reference herein in their entireties.

BACKGROUND

1. Technical Field

Embodiments of the present inventive concept relate to a system on chip (SoC), a mobile electronic device including the same, and a method of operating the SoC.

2. Discussion of Related Art

A system on chip (SoC) refers to a technology which integrates various functional blocks such as a central processing unit (CPU), a memory, an interface, a digital signal processing circuit, and an analog signal processing circuit into one semiconductor integrated circuit or an integrated circuit (IC) integrated to embody a computer system or another electronic system.

The SoC has been developed into a more complicated system which includes various functions such as multimedia, graphics processing, and security. The various functional blocks integrated into the SoC may be connected to each other in a master-slave form. A master transmits a request to a slave, and the slave transmits a response according to the request to the master. That is, the functional blocks may be paired with each other, and a signal path for each functional block pair may be formed.

As integrity and a size of the SoC are increased, and the number of functional blocks which are included is increased, the number of signal paths which are formed is increased and therefore power consumption is also increased.

SUMMARY

According to an exemplary embodiment of the present inventive concept, a system on chip (SoC) is provided including a plurality of master interfaces, a plurality of slave interfaces, and an interface circuit which is connected between the plurality of master interfaces and the plurality of slave interfaces and includes a plurality of components. When a first master interface among the plurality of master interfaces and a first slave interface among the plurality of slave interfaces are paired, a first group of the components which forms a first signal path between the first master interface and the first slave interface among the plurality of components is enabled according to a control of the first master interface. The first master interface may select the first slave interface according to a first request transmitted from a first master.

The first group of components may be enabled according to a control of the first master interface before the first request is transmitted to the first slave interface. The first slave interface may transmit a first response transmitted from a first slave by the first request to the first master interface through the first signal path.

The first group of components which are enabled may be disabled according to a control of the first master interface after the first response is transmitted to the first master interface.

According to an exemplary embodiment, when the first master interface and a second slave interface among the plurality of slave interfaces are paired, a second group of components which forms a second signal path between the first master interface and the second slave interface among the plurality of components are enabled according to a control of the first master interface. The first master interface may select the second slave interface according to a second request transmitted from a first master.

Some of the first group of components may be shared by the first signal path and the second signal path. The SoC may further include a clock signal generator which supplies a clock signal corresponding to each of the first group of components. The first master interface may include an enable signal generator which generates each of enable signals for enabling each of the first group of components.

According to an exemplary embodiment, the first master interface further includes a memory, the first master interface decodes a first request transmitted from a first master, generates information on the first group of components which forms the first signal path according to a result of the decoding, and stores the generated information in the memory, and the enable signal generator generates the enable signals according to the generated information stored in the memory.

Each of the plurality of components may be one of an M-to-1 switch circuit, a 1-to-N switch circuit, and a bridge circuit, and M and N are natural number greater than one.

An exemplary embodiment of the present inventive concept, a mobile electronic device includes the above-described system on chip (SoC) and a display which operates according to a control of the SoC.

According to an exemplary embodiment of the present inventive concept, a method of operating a system on chip (SoC) is provided. The SoC includes an interface circuit that is connected between a master interface and a plurality of slave interfaces and includes a plurality of components. The method includes receiving, by the master interface, a first request from a master, decoding, by the master interface, the received first request, enabling a first group of components among the plurality of components, which are present in a first signal path formed between a first slave interface selected among the plurality of slave interfaces and the first master interface according to a result of the decoding, and transmitting, by the master interface, the first request to the first slave interface through the first signal path.

In an exemplary embodiment, the enabling includes generating, by the first master interface, a plurality of enable signals for enabling each of the first group of components, outputting, by the first master interface, the enable signals to the first group of components, and enabling each of the first group of components when a clock signal is received by each component.

The method of operating an SoC may further include transmitting, by the first slave interface, a first response transmitted from a first slave to the first master interface through the first signal path according to the first request. The method of operating an SoC may further include disabling each of the first group of enabled components according to a control of the first master interface after the first response is transmitted to the first master interface.

According to an exemplary embodiment of the inventive concept, a system on chip (SoC) is provided. The SoC includes a plurality of master interfaces, a plurality of slave interfaces, and an interface circuit which is connected between the plurality of master interfaces and the plurality of slave interfaces, and includes a plurality of components. A first master device among the master interfaces is configured to form a first signal path including a first group of the components between the first master device and a first slave interface among the slave interfaces. The first master device disables the components of the first group that are not shared by a second signal path prior to the SoC forming the second signal path between one of the master interfaces and one of the slave interfaces.

In an exemplary embodiment, the SoC includes a table that stores a first entry associated with a first request and identifying the components within the first signal path and a second entry associated with a second request and identifying the components within the second signal path, and the SoC deletes the first entry after a response to the first request has been received.

In an exemplary embodiment, each entry further identifies at least one of the slave interfaces.

In an exemplary embodiment, each component in the first group includes an arbitration circuit configured to manage output of a request from the first master interface to another one of the components in the first group or to one of the slave interfaces in response to an internal clock signal, and a routing circuit configured to manage output of a response to the request to another one of the components in the first group or to the first master interface in response to the internal clock signal.

In an exemplary embodiment, each component further comprises a control circuit that prevents the arbitration circuit and the routing circuit from receiving the internal clock signal when the component is disabled.

BRIEF DESCRIPTION OF THE DRAWINGS

The inventive concept will become apparent and more readily appreciated from the following description of the embodiments, taken in conjunction with the accompanying drawings of which:

FIGS. 6A and 6B show schematic exemplary embodiments of request tables shown in FIG. 5;

FIG. 7 is a block diagram which shows an exemplary embodiment of a component included in an interface circuit shown in FIGS. 2 and 3;

FIG. 12 is a flowchart which shows a method of operating an SoC according to an exemplary embodiment of the present inventive concept; and FIG. 13 is a block diagram which shows an exemplary embodiment of an electronic system according to an exemplary embodiment of the present inventive concept.

DETAILED DESCRIPTION

Figure 1:
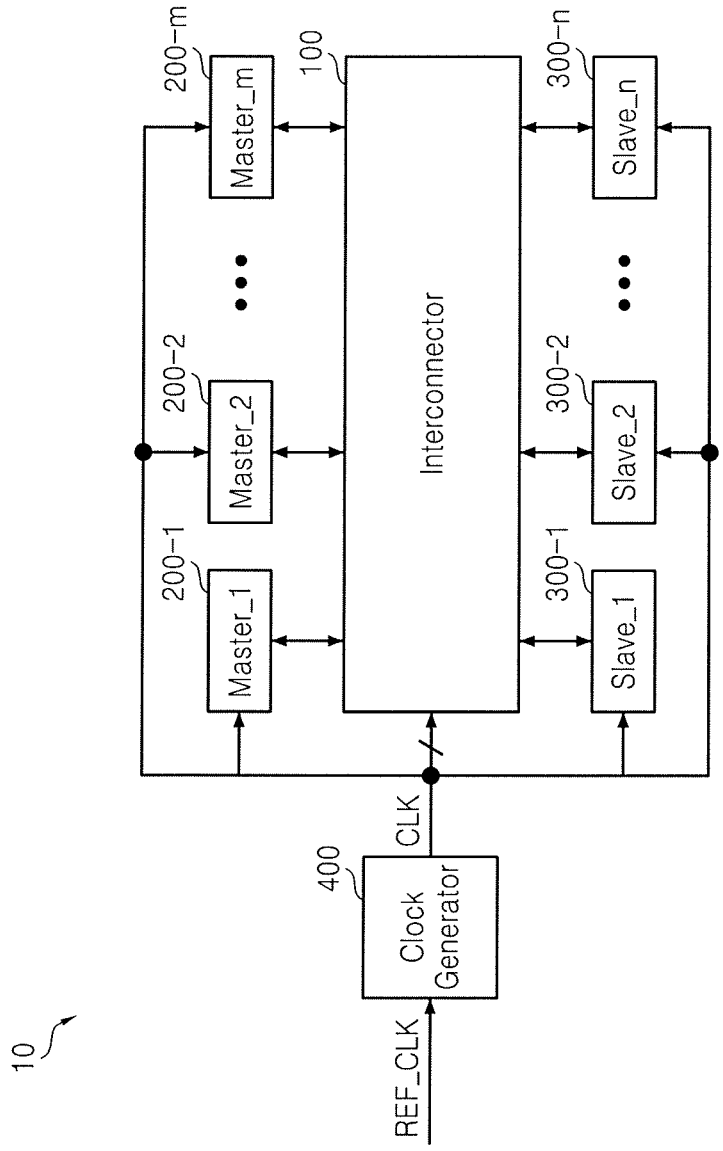
FIG. 1 is a block diagram of a system on chip (SoC) according to an exemplary embodiment of the present inventive concept.

The present inventive concept now will be described more fully hereinafter with reference to the accompanying drawings, in which embodiments of the inventive concept are shown. The inventive concept may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

FIG. 1 is a block diagram of a system on chip (SoC) according to an exemplary embodiment of the present inventive concepts. Referring to FIG. 1, an SoC 10 includes a plurality of masters 200-1, 200-2, to 200-*m*, where m is a natural number greater than one, a plurality of slaves 300-1, 300-2, to 300-*n*, where n is a natural number greater than one, and an interconnector 100. According to an exemplary embodiment, the SoC 10 is embodied in an integrated circuit, an application processor (AP), or a mobile AP. In an exemplary embodiment, each of the slaves and the masters are physical devices, and the interconnector 100 is a physical device that enables the masters and the slaves to communicate with one another.

Each of the masters 200-1 to 200-*m* may transmit a corresponding request to any one of the plurality of slaves 300-1 to 300-*n*. In an exemplary embodiment, a master transmits a request to a slave by transmitting a request message to the slave indicating a request for a particular service or data. The one slave may process a received request and transmit a response according to a result of the process to a master which transmits the request. According to an exemplary embodiment, each of the plurality of masters 200-1 to 200-*m* and the plurality of slaves 300-1 to 300-*n* may be a central processing unit (CPU), a graphic processing unit (GPU), a direct memory access (DMA) controller, an image signal processor (ISP), and one of various interface controllers. Each of the plurality of masters 200-1 to 200-*m* may operate as a master, and may operate as a slave according to an exemplary embodiment. Each of the plurality of slaves 300-1 to 300-n may operate as a slave, and may operate as a master according to an exemplary embodiment.

An interconnector 100 is connected between the plurality of masters 200-1 to 200-m and the plurality of slaves 300-1 to 300-n. The interconnector 100 forms a signal path between one (e.g., 200-1) of the plurality of masters 200-1 to 200-m and one (e.g., 300-1) of the plurality of slaves 300-1 to 300-n. The one master 200-1 transmits a request to the slave 300-1 through the signal path, and receives a response according to the request from the slave 300-1. A structure and an operation of the interconnector 100 will be described referring to FIG. 2.

According to an exemplary embodiment, the SoC 10 further includes a clock generator 400. As an example, the clock generator 400 is a circuit that produces a timing signal (e.g., a square wave) for use in a synchronizing a circuit's operation. The clock generator 400 may receive a reference clock signal REF_CLK from an outside source. The clock generator 400 supplies the reference clock signal REF_CLK or a clock signal CLK generated using the reference clock signal REF_CLK to the plurality of masters 200-1 to 200-m, the plurality of slaves 300-1 to 300-n, and the interconnector 100.

FIG. 1 shows that the clock generator 400 supplies the same clock CLK to the plurality of masters 200-1 to 200-m, the plurality of slaves 300-1 to 300-n, and the interconnector 100. However, the clock generator 400 supplies each of clock signals having different frequencies to each of the plurality of masters 200-1 to 200-m, the plurality of slaves 300-1 to 300-n, and the interconnector 100 according to an exemplary embodiment.

Figure 2:
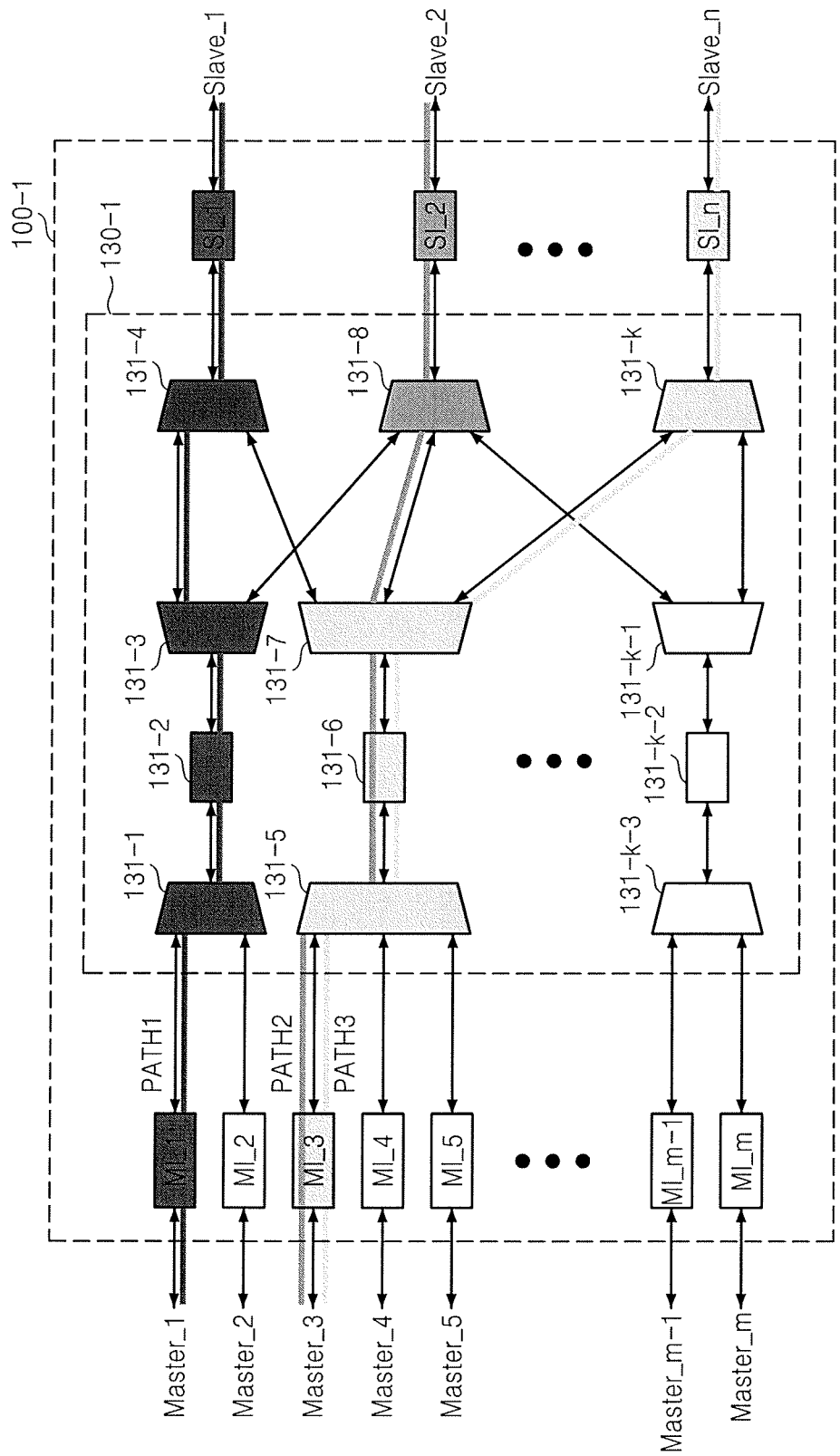
FIG. 2 is a block diagram which shows an exemplary embodiment for describing an operation of the SoC shown in FIG. 1.

FIG. 2 is a block diagram which shows an exemplary embodiment for describing an operation of the SoC shown in FIG. 1. Referring to FIGS. 1 and 2, an interconnector 100-1 includes a plurality of master interfaces MI_1 to MI_m, a plurality of slave interfaces SI_1 to SI_n, and an interface circuit 130-1.

Each of the plurality of master interfaces MI_1 to MI_m may be connected to one of the plurality of masters 200-1 to 200-m. Each of the plurality of master interfaces MI_1 to MI_m may transmit a received request to one of the plurality of slave interfaces SI_1 to SI_n when a request is received from each corresponding master. A structure and an operation of the plurality of master interfaces MI_1 to MI_m will be described referring to FIGS. 4 and 5.

Each of the plurality of slave interfaces SI_1 to SI_n may be connected to one of the plurality of slaves 300-1 to 300-n. Each of the plurality of slave interfaces SI_1 to SI_n may receive a request from one of the plurality of master interfaces MI_1 to MI_m, and transmit a received request to a corresponding slave.

Each of the plurality of slave interfaces SI_1 to SI_n may transmit a response received from a corresponding slave to one of the master interfaces. According to an exemplary embodiment, at least one of the plurality of master interfaces MI_1 to MI_m is used as a slave interface, and at least one of the plurality of slave interfaces SI_1 to SI_n is used as a master interface.

The interface circuit 130-1 is connected between the plurality of master interfaces MI_1 to MI_m and the plurality of slave interfaces SI_1 to SI_n. The interface circuit 130-1 includes a plurality of signal paths in which one (e.g., MI_1) of the plurality of master interfaces MI_1 to MI_m is paired with one (e.g., SI_1) of the plurality of slave interfaces SI_1 to SI_n. The interface circuit 130-1 may include a plurality of components 131-1, 131-2, 131-3, 131-4, 131-5, 131-6, 131-7, 131-8, 131-k-3, 131-k-2, 131-k-1 to 131-k, where k is a natural number greater than one. Each of the plurality of signal paths may include at least one of the plurality of components 131-1 to 131-k. While FIG. 2 shows 12 components 131-1 to 131-k, this is merely one example, as there may be a fewer or greater number of components.

According to an exemplary embodiment, each of the plurality of components 131-1 to 131-k is one of an M-to-1 switch (where M is a natural number greater than one), a 1-to-N switch (where N is a natural number greater than one), a multiplexor, a de-multiplexor, and a bridge. However, the inventive concept is not limited thereto.

FIG. 2 shows an interface 130-1 in which a plurality of M-to-1 switches 131-1, 131-4, 131-5, 131-8, 131-k-3, and 131-k, a plurality of bridges 131-2, 131-6, and 131-k-2, and a plurality of 1-to-N switches 131-3, 131-7, and 131-k-1 are arranged; however, a form of the interface circuit 130-1 according to the present inventive concepts is not limited thereto, and the number and an arrangement of components included in the interface circuit 130-1 may be variously changed according to an exemplary embodiment.

An operation of the interconnector 100-1 will be described referring to FIG. 2. When a first master 200-1 transmits a first request to a first slave 300-1, the first master interface MI_1 enables only a first group of components 131-1 to 131-4 which forms a first signal path PATH1 between a first master interface MI_1 and a first slave interface SI_1. Accordingly, the first signal path is activated.

When the first group of components 131-1 to 131-4 is enabled, the first master interface MI_1 may transmit a first request to the first slave interface SI_1 through the first signal path PATH1 which is activated. According to an exemplary embodiment, the first slave interface SI_1 may be enabled by the first master interface MI_1.

When a third master 200-3 transmits a second request to a second slave 300-2, a third master interface MI_3 enables only a second group of components 131-5 to 131-8 which forms a second signal path PATH2 between a third master interface MI_3 and a second slave interface SI_2. Accordingly, the second signal path PATH2 is activated. After the second group of components 131-5 to 131-8 is enabled, the third master interface MI_3 may transmit a second request to the second slave interface SI_2 through the second signal path PATH2 which is activated. According to an exemplary embodiment, the second slave interface SI_2 may be enabled by the third master interface MI_3.

When the third master 200-3 transmits a third request to an $n^{th}$ slave 300-n, the third master interface MI_3 enables only a third group of components 131-5 to 131-7 and 131-k which forms a third signal path PATH3 between the third master interface MI_3 and an $n^{th}$ slave interface SI_n. Accordingly, the third signal path PATH3 may be activated.

When the third group of components 131-5 to 131-7 and 131-k is enabled, the third master interface MI_3 may transmit a third request to the $n^{th}$ slave interface SI_n through the third signal path PATH3 which is activated. According to an exemplary embodiment, the $n^{th}$ slave interface SI_n may be enabled by the third master interface MI_3.

In an exemplary embodiment, a master interface enables a component or a slave interface by providing a clock signal to the component or slave interface. In an exemplary embodiment, a master interface enables a component or a slave interface by supplying power to the component or slave interface that is sufficient to turn on the corresponding device. In an exemplary embodiment, a master interface enables a component or a slave interface by applying a control signal to the corresponding device that sets the corresponding device from a power-save mode to a normal mode, where the device in the normal mode uses more power than the device in the power-save mode.

As shown in FIG. 2, some components 131-5 to 131-7 among the second group of components 131-5 to 131-8 may be shared by the second signal path PATH2 and the third signal path PATH3. That is, each of the plurality of components 131-1 to 131-$k$ may be shared by each of different paths.

According to an exemplary embodiment, when the second request and the third request are successively processed, and the third master interface MI_3 enables the third group of components 131-5 to 131-7 and 131-$k$ according to the third request, some components 131-5 to 131-7 may be already enabled according to the second request. Accordingly, the third master interface MI_3 enables only a $k^{th}$ component 131-$k$, thereby activating the third signal path PATH3.

In an exemplary embodiment, the SoC 10 records which components have been recently or previously enabled, and then during a subsequent attempt by a master interface to enable components and a slave interface within a desired path, the SoC 10 determines from the recordings which of those components and slave interface within the desired path have already been enabled and only enables the remaining components or slave interface in the desired path that have been determined not to be enabled (i.e., disabled).

Figure 3:
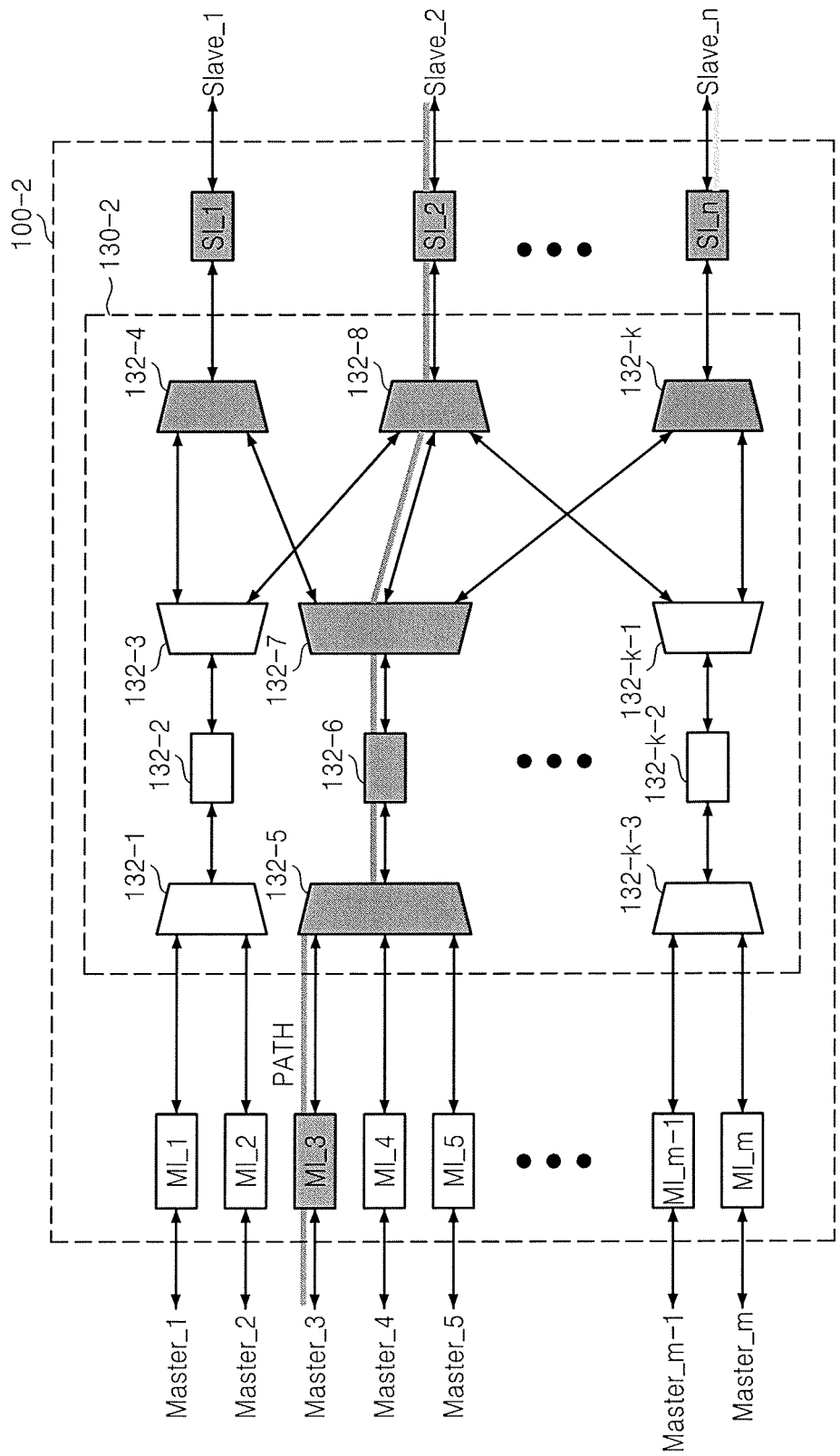
FIG. 3 is a block diagram which shows an exemplary embodiment for describing an operation of the SoC shown in FIG. 1.

FIG. 3 is a block diagram which shows an exemplary embodiment for describing an operation of the SoC shown in FIG. 1. Referring to FIGS. 1 to 3, each of a plurality of components 132-1 to 132-$k$ is substantially the same as or similar to each of the plurality of components 131-1 to 131-$k$ shown in FIG. 2.

The third master 200-3 may be connected to a first slave 300-1, a second slave 300-2, and an nth slave 300-$n$ among the plurality of slaves 300-1 to 300-$n$, thereby transmitting a request to one of the first slave 300-1, the second slave 300-2, and the $n^{th}$ slave 300-$n$. According to an exemplary embodiment, when the third master 200-3 transmits a request to the second slave 300-2, the third master interface MI_3 enables components 132-5 to 132-8 which form a signal path PATH between the third master interface MI_3 and the second slave interface SI_2, thereby activating the signal path PATH. The third master interface MI_3 may additionally enable components 132-4 to 132-$k$.

Accordingly, the third master interface MI_3 may activate other signal paths, e.g., a signal path between the third master interface MI_3 and the first slave interface SI_1, and a signal path between the third master interface MI_3 and an $n^{th}$ slave interface SI_n. When components 132-4 to 132-8 and 132-$n$ are enabled, the third master interface MI_3 may transmit the request to the second slave interface SI_2 through the activated signal path PATH.

According to an exemplary embodiment, the third master interface MI_3 enables the first slave interface SI_1, the second slave interface SI_2, and the $n^{th}$ slave interface SI_n. That is, when the third master interface MI_3 receives a request from the third master 200-3, the third master interface MI_3 may enable all components 132-4 to 132-8 and 132-$k$ controlled by the third master interface MI_3, regardless of a signal path to which the request is transmitted. For example, even though the last component 132-4 and a first slave interface SI_1 can be part of a first signal path managed by the first master device MI_1, the third master device MI_3 is still capable of disabling the last component 132-4 and the first slave interface SI_n.

When there is no more request received from the third master 200-3, the third master interface MI_3 may disable the enabled components 132-4 to 132-8 and 132-$k$. According to an exemplary embodiment, the third master interface MI_3 may disable the enabled slave interfaces SI_1, SI_2, and SI_n. For example, if no request has been transmitted over a given enabled signal path within a predefined period of time, the components and slave device within the given signal path are disabled. The master interface can disable a given signal path by preventing a clock signal from being applied to the components and the slave device, by preventing power from being applied to the components and the slave interface, or by applying a control signal to the respective devices to set those devices to a power-save mode.

Figure 4:
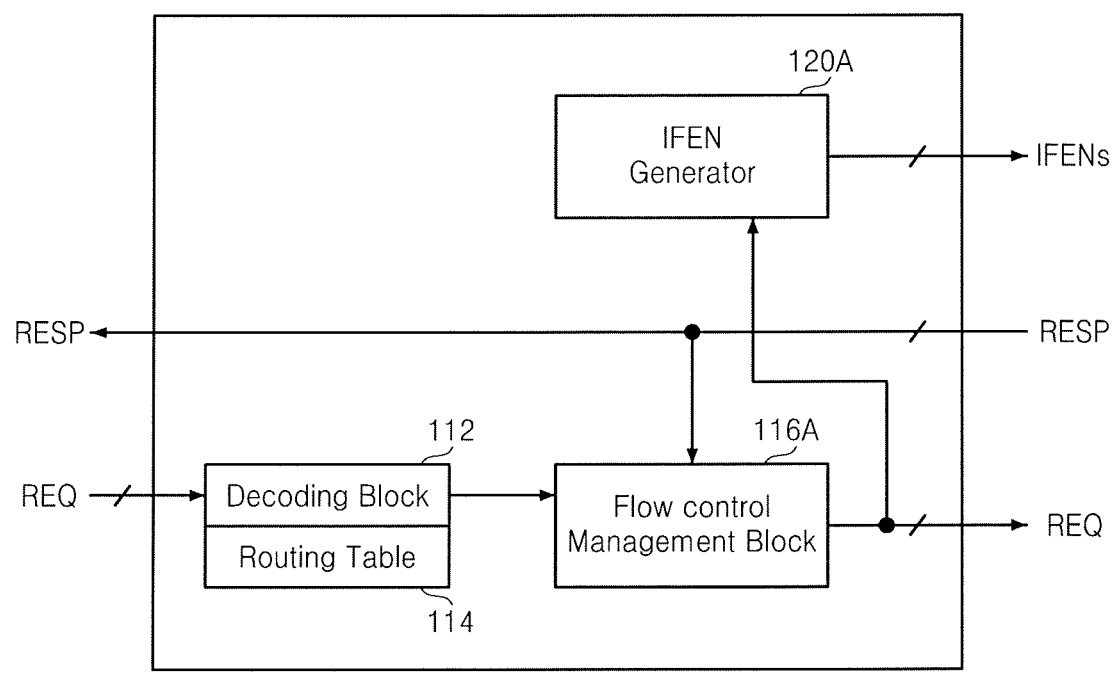
FIG. 4 is a block diagram which shows an exemplary embodiment of a master interface shown in FIGS. 2 and 3.

FIG. 4 is a block diagram which shows an exemplary embodiment of the master interface shown in FIGS. 2 and 3. Referring to FIGS. 1 to 4, a master interface (e.g., a first master interface MI_1A) includes a decoding block 112, a routing table 114, a flow control management block 116A, and an interface enable signal (IFEN) generator 120A.

The decoding block 112 decodes a request REQ received from a master (e.g., the first master 200-1). The decoding block 112 may determine a target slave interface (or target slave) corresponding to the request REQ according to a result of the decoding. For example, the decoding block 112 decodes the request REQ to determine which slave interface or slave device is the intended recipient of the request. The request REQ may include an address that identifies the intended recipient slave interface or slave device. The decoding block 112 may be embodied by logic circuits, a field programmable gate array, etc.

The routing table 114 may include information on each of paths between each of slave interfaces (e.g., the first slave interface SI_1 and the second slave interface SI_2) which can be connected to the first master interface MI_1A and the first master interface MI_1A. For example, the information may identify the components and their order within a given path. The routing table 114 may be stored in a memory, and the information may be stored in the routing table 114. For example, the information may indicate whether one of the components is sharable amongst several slave interfaces or signal paths. The memory may be located within the SoC 10.

The decoding block 112 may read first information on a signal path between a target slave and the first master interface MI_1A from the routing table 114 when the target slave is determined. The decoding block 112 may output the request REQ and the first information which is read. The first information may be information on components present in the signal path. For example, the first information may identify each component and slave interface within the signal path and the order of components within the signal path.

The flow control management block 116A receives the request REQ and the first information output from the decoding block 112. The flow control management block 116A determines whether or not to transmit the request REQ, and output the request REQ and the first information. In an exemplary embodiment, the flow control management block 116A is embodied by logic circuits or a field programmable gate array.

According to an exemplary embodiment, when there is a plurality of requests, the flow control management block 116A determines a priority for each of the plurality of requests, and sequentially outputs the plurality of requests according to the determined priorities. For example, the flow control management block 116A may output a next request when the first master interface MI_1A receives a response for a current request.

An IFEN generator 120A receives the first information output from the flow control management block 116A. The IFEN generator 120A may output each of a plurality of activated interface enable signals IFENs to each of the components so as to enable each of the components which are included in the received first information and present in the signal path. According to an exemplary embodiment, the IFEN generator 120A outputs each of a plurality of inactivated interface enable signals IFENs to each of enabled components so as to disable each of the enabled components. In an exemplary embodiment the IFEN generator 120A is a signal generation circuit.

In an exemplary, a plurality of activated interface enable signals IFENs is understood to mean that the plurality of interface enable signals IFENs are output, and a plurality of inactivated interface enable signals IFENs is understood to mean that the plurality of interface enable signals IFENs are not output. According to an exemplary embodiment, the IFEN generator 120A may enable/disable even a target slave interface corresponding to the request REQ. For example, if no request has been received over a given signal path within a predefined time period, the interface enable signals IFENS that are needed to keep the components and slave interfaces of the signal path enabled are not output.

Figure 5:
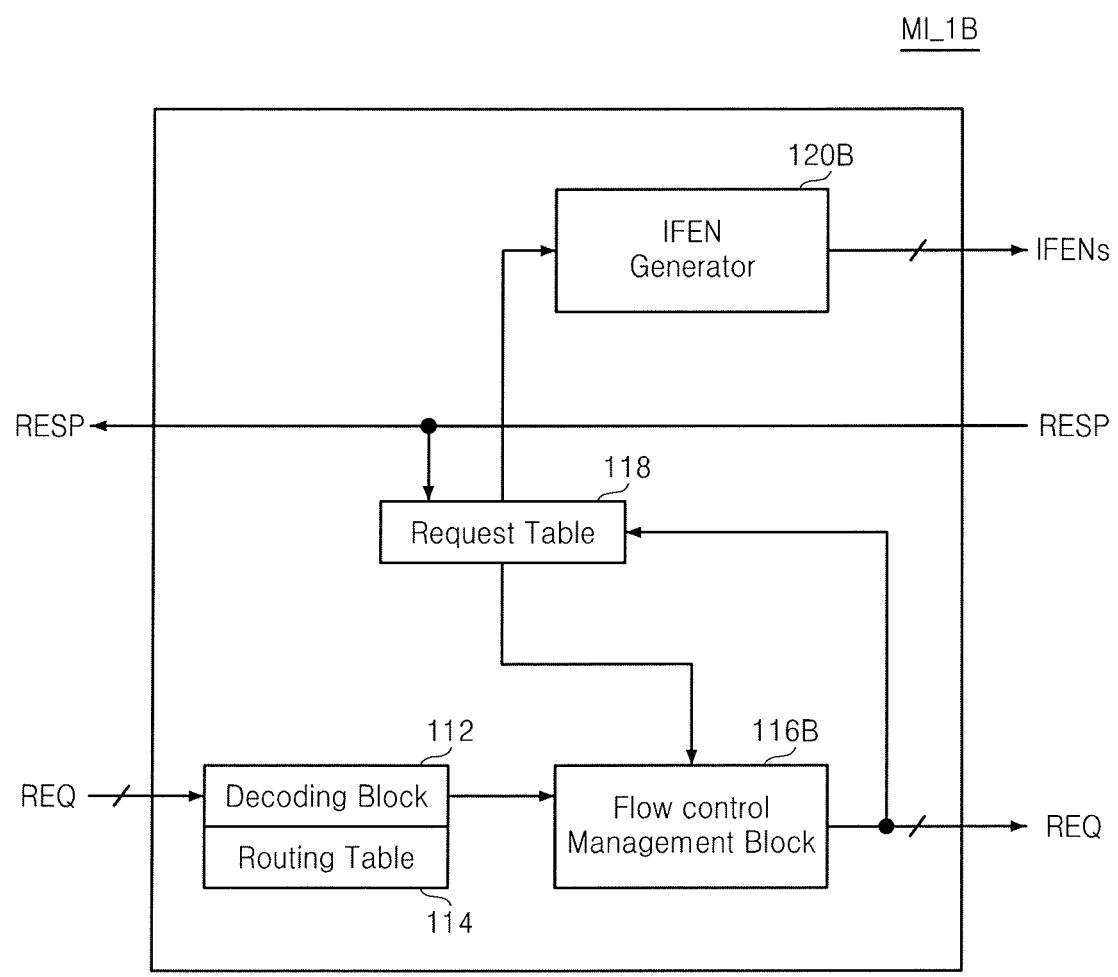
FIG. 5 is a block diagram which shows an exemplary embodiment of the master interface shown in FIGS. 2 and 3.

FIG. 5 is a block diagram which shows an exemplary embodiment of the master interface shown in FIGS. 2 and 3. Referring to FIGS. 2 to 5, each of the decoding block 112 and the routing table 114 shown in FIG. 5 is substantially the same as each of the decoding block 112 and the routing table 114 shown in FIG. 4.

A master interface (e.g., a first master interface MI_B) may include a request table 118. The request table 118 stores a request REQ and information on the request REQ output from a flow control management block 116B.

The information on the request REQ may be information on at least one component (e.g., the first group of components 131-1 to 131-4) which forms a signal path (e.g., the first signal path PATH1) between a pair of a target slave interface (e.g., SI_1) corresponding to the request REQ and the first master interface MI_1. For example, the information identifies the components that form the signal path. According to an exemplary embodiment, the information may further include information on the target slave interface SI_1. For example, the information may further identify the target slave interface of the signal path. The request table 118 may be stored in a memory, and the information may be stored in the request table 118. The memory may be located within the SoC 10.

When the first master interface MI_1B receives a response RESP for a request REQ, the request table 118 may erase the information which is stored. After the response RESP is received, the flow control management block 116B may output a next request. The response RESP is sent by the slave device to a slave interface in response to receipt of the request REQ sent by the master interface, and the slave interface sends the response RESP to the master interface. For example, if the request REQ indicated a request for certain data from the slave device, the response RESP could include that data or a message indicating the data is not available. For example, if the request REQ indicated a request to perform a certain function, the response RESP could include data resulting from performing the function.

The IFEN signal generator 120B may output each of a plurality of activated interface enable signals IFENs to each of a plurality of components so as to enable each of the plurality of components included in the information stored in the request table 118. According to an exemplary embodiment, the IFEN generator 120B outputs each of a plurality of inactivated interface enable signals IFENs to each of the plurality of enabled components so as to disable each of the plurality of enabled components as the information stored in the request table 118 is erased.

FIGS. 6A and 6B show schematic exemplary embodiments of request tables shown in FIG. 5. The request table 118 shown in FIGS. 6A and 6B is merely an example, as the configuration and form of the request table 118 are not limited thereto. Referring to FIGS. 2, 5, and 6A, the request table 118 includes information on a path of a request output from the flow control management block 116B.

The request table 118 may include a plurality of entries, and each of the plurality of entries may include the information on a path of a request. The information on a path of the request may be information on at least one component which forms a signal path between a pair of a target slave interface and a master interface for the request.

The request table 118 may include a component field 119B which includes information on the at least one component. For example, the component field 119B includes information identifying all the components in given signal path and their order. According to an exemplary embodiment, the request table 118 further includes a request field 119A which shows an index of a request REQ. However, in an alternate embodiment, the request field 119A is not present. The index may be used as a key to select the path associated with a particular request REQ.

For example, it is assumed that a request REQ is transmitted to the first slave interface SI_1 from the first master interface MI_1, and a next request REQ1 is transmitted to the second slave interface SI_2 from the first master interface MI_1. The request table 118 may include a first entry for the request REQ and a second entry for the next request REQ1.

An index of the request REQ may be stored in the request field 119A for the first entry, and information on the components 131-1 to 131-4 present in a path of the request REQ may be stored in the component field 119B. An index of the next request REQ1 may be stored in the request field 119A for the second entry, and information on components 131-1 to 131-3 and 131-8 present in a path of the next request REQ1 may be stored in the component field 119B.

The IFEN generator 120B may output each of the plurality of activated interface enable signals IFENs to each of the components 131-1 to 131-4 and 131-8 using the information on the components 131-1 to 131-4 and 131-8 stored in the component field 119B of the request table 118.

According to an exemplary embodiment, the request table 118 further includes a slave interface field 119C for storing information of a target slave interface for the request REQ. For example, the slave interface field 119c identifies the target slave interface of a signal path associated with a given request. The IFEN generator 120B may output each of the plurality of activated interface enable signals IFENs to each of the slave interfaces SI_1 and SI_2 using information on the slave interfaces SI_1 and SI_2 stored in the slave interface field 119C.

FIGS. 6A and 6B show each of the component field 119B and the slave interface field 119C as separate fields, but the component field 119B and the slave interface field 119C may be embodied in one field according to an exemplary embodiment. According to another exemplary embodiment, only the slave interface field 119C is embodied instead of the component field 119B. Referring to FIGS. 5 and 6B, when a response RESP for a request REQ is received, the first entry for the request REQ stored in the request table 118 may be erased.

In an exemplary embodiment, the IFEN generator 120B disables a component 131-4 which is not present in the component field 119B of the request table 118 when the first entry is erased. According to an exemplary embodiment, the IFEN generator 120B disables the first slave interface SI_1 which is not present in the slave interface field 119C of the request table 118 when the first entry is erased. For example, after the first entry is erased, since the component 131-4 and the first interface SI_1 are not present in a remaining entry (e.g., REQ1), they can be disabled.

FIG. 7 is a block diagram which shows an exemplary embodiment of a component included in the interface circuit shown in FIG. 2. A component 131-1 shown in FIG. 7 shows an exemplary embodiment of a 2-to-1 switch. The request REQ shown in FIG. 4 may include a request valid signal REQ_VALID, a request ready signal REQ_READY, and a request payload REQ_PAYLOAD as shown in FIG. 7.

A current component (or master interface) may output a request valid signal REQ_VALID so as to inform a next component (or slave interface) that a request payload to be transmitted is present. The next component (or the slave interface) may receive a request valid signal REQ_VALID, and output a request ready signal REQ_READY so as to inform the current component (or master interface) that the next component is ready to receive a request payload REQ_PAYLOAD.

A response RESP shown in FIG. 4 may include a response valid signal RESP_VALID, a response ready signal RESP_READY, and a response payload RESP_PAYLOAD as shown in FIG. 7.

The current component (or slave interface) may output a response valid signal RESP_VALID so as to inform a previous component (or a master interface) that a response payload to be transmitted is present. The previous component (or the master interface) may receive a response valid signal RESP_VALID, and output a response ready signal RESP_READY so as to inform the current component (or slave interface) that the previous component is ready to receive a response payload RESP_PAYLOAD.

Referring to FIGS. 2, 4, and 7, a component 131-1 included in the interface circuit 130-1 includes a request arbiter 133-1, a response router 134-1, and a clock gating block 135-1.

The request arbiter 133-1 may manage a transmission of a request REQ, and the response router 134-1 may manage a transmission of a response RESP. The request arbiter 133-1 may receive a first request valid signal REQ_VALID0 from a first master interface MI_1, and output a first request ready signal REQ_READY0 to the first master interface MI_1 when the component 131-1 is enabled by receiving an internal clock INT_CLK. The first master interface MI_1 may transmit a first request payload REQ_PAYLOAD0 to the component 131-1 in response to the first request ready signal REQ_READY.

The request arbiter 133-1 may receive a second request valid signal REQ_VALID1 from a second master interface MI_2, and output a second request ready signal REQ_READY1 to the second master interface MI_2 when the component 131-1 is enabled by receiving an internal clock INT_CLK. The second master interface MI_2 may transmit a second request payload REQ_PAYLOAD1 to the component 131-1 in response to the second request ready signal REQ_READY1.

According to an exemplary embodiment, when the request arbiter 133-1 receives the first request valid signal REQ_VALID0 and the second request valid signal REQ_VALID1 at the same time, the request arbiter 133-1 determines a request with higher priority between a first request and a second request. For example, when the first request has a higher priority than the second request, the request arbiter 133-1 outputs the first request ready signal REQ_READY0 to the first master interface MI_1 before outputting the second request ready signal REQ_READY1 to the second master interface MI_2.

The request arbiter 133-1 may output a request valid signal REQ_VALID to a next component 131-2 of the component 131-1, and output a request payload REQ_PAYLOAD to the next component 131-2 after receiving the request ready signal REQ_READY from the next component 131-2. The request payload REQ_PAYLOAD may be a first request payload REQ_PAYLOAD0 or a second request payload REQ_PAYLOAD1.

The response router 134-1 may receive a response valid signal RESP_VALID from the next component 131-2, and output a response ready signal RESP_READY to the next component 131-2. The next component 131-2 may transmit a response payload RESP_PAYLOAD to the component 131-1 in response to the response ready signal RESP_READY. The response router 134-1 may output a first response valid signal RESP_VALID0 to a target master interface (e.g., the first master interface MI_1) for a response RESP, and output a first response payload RESP_PAYLOAD0 to the first master interface MI_1 after receiving the first response ready signal RESP_READY0 from the first master interface MI_1. The first response payload RESP_PAYLOAD0 may be a response payload RESP_PAYLOAD transmitted from the next component 131-2 to the component 131-1.

The request arbiter 133-1 and the response router 134-1 may operate in response to an internal clock INT_CLK from a clock gating block 135-1. The component 131-1 being enabled means that the request arbiter 133-1 and the response router 134-1 operate based on the internal clock INT_CLK.

The clock gating block 135-1 may receive a clock CLK from the clock generator 400, and supply the internal clock INT_CLK to the request arbiter 133-1 and the response router 134-1 in response to an activated component enable signal O_IFEN input to the component 131-1. The clock CLK and the internal clock INT_CLK may be substantially the same as each other.

The clock gating block 135-1 may include a clock finite state machine (FSM) block 136-1 and a clock gate 137-1. The clock FSM block 136-1 may activate the clock gate 137-1 in response to the activated component enable signal O_IFEN. As the clock gate 137-1 is activated, the internal clock INT_CLK is supplied to the request arbiter 133-1 and the response router 134-1. When the internal clock INT_CLK is supplied, the component 131-1 is enabled. In an exemplary embodiment, the clock gate 137-1 is embodied by a transistor, where an input terminal of the transistor receives the clock signal CLK, and an output terminal of the transistor outputs the internal clock INT_CLK when a gate terminal of the transistor receives an output from the clock FSM block 136-1 that turns on the transistor.

The clock FSM block 136-1 may output a guard enable signal GUARD_EN to the request arbiter 133-1 in response to an inactivated component enable signal O_IFEN. The request arbiter 133-1 does not receive a request any longer in response to the guard enable signal GUARD_EN. For example, the request arbiter 133-1 may be prevented from receiving requests while the guard enable signal GUARD_EN is received. The clock FSM block 136-1 inactivates the clock gate 137-1 in response to the inactivated component enable signal O_IFEN. When the clock gate 137-1 is inactivated, the internal clock INT_CLK is not supplied to the request arbiter 133-1 and the response router 134-1. When the internal clock INT_CLK is not supplied, the component 131-1 is disabled.

In an exemplary embodiment, the component enable signal O_IFEN is generated when an OR operation is performed on at least one interface enable signal output from at least one master interface which can control the component 131-1. The OR operation may be performed by an OR operation block 138-1. The OR operation block 138-1 may be embodied as at least one OR gate. However the inventive concept is not limited thereto. While it is shown that the OR operation block 138-1 is located outside the component 131-1 in FIG. 7, the OR operation block 138-1 may be located within the component 131-1 according to an exemplary embodiment.

Referring to FIGS. 2 and 7, the component 131-1 may be controlled by the first master interface MI_1 and the second master interface MI_2. Accordingly, the OR operation block 138-1 may receive an interface enable signal IFEN output from the first master interface MI_1 and an interface enable signal IFEN output from the second master interface MI_2.

When an activated interface enable signal IFEN is output from the first master interface MI_1 and/or the second master interface MI_2, the OR operation block 138-1 outputs an activated component enable signal O_IFEN. When an inactivated interface enable signal IFEN is output from each of the first master interface MI_1 and the second master interface MI_2, the OR operation block 138-1 outputs the activated component enable signal O_IFEN. When an inactivated interface enable signal IFEN is output from each of the first master interface MI_1 and the second master interface MI_2, the OR operation block 138-1 outputs the inactivated component enable signal O_IFEN. The clock gating block 135-1 and the OR operation block 138-1 shown in FIG. 7 may be formed in accordance with each of a plurality of components 131-1 to 131-$k$ included in the interface circuit 130-1. In an exemplary embodiment, the request arbiter 133-1 and the response router 134-1 are embodied by one or more logic circuits or a field programmable gate array.

Figure 8:
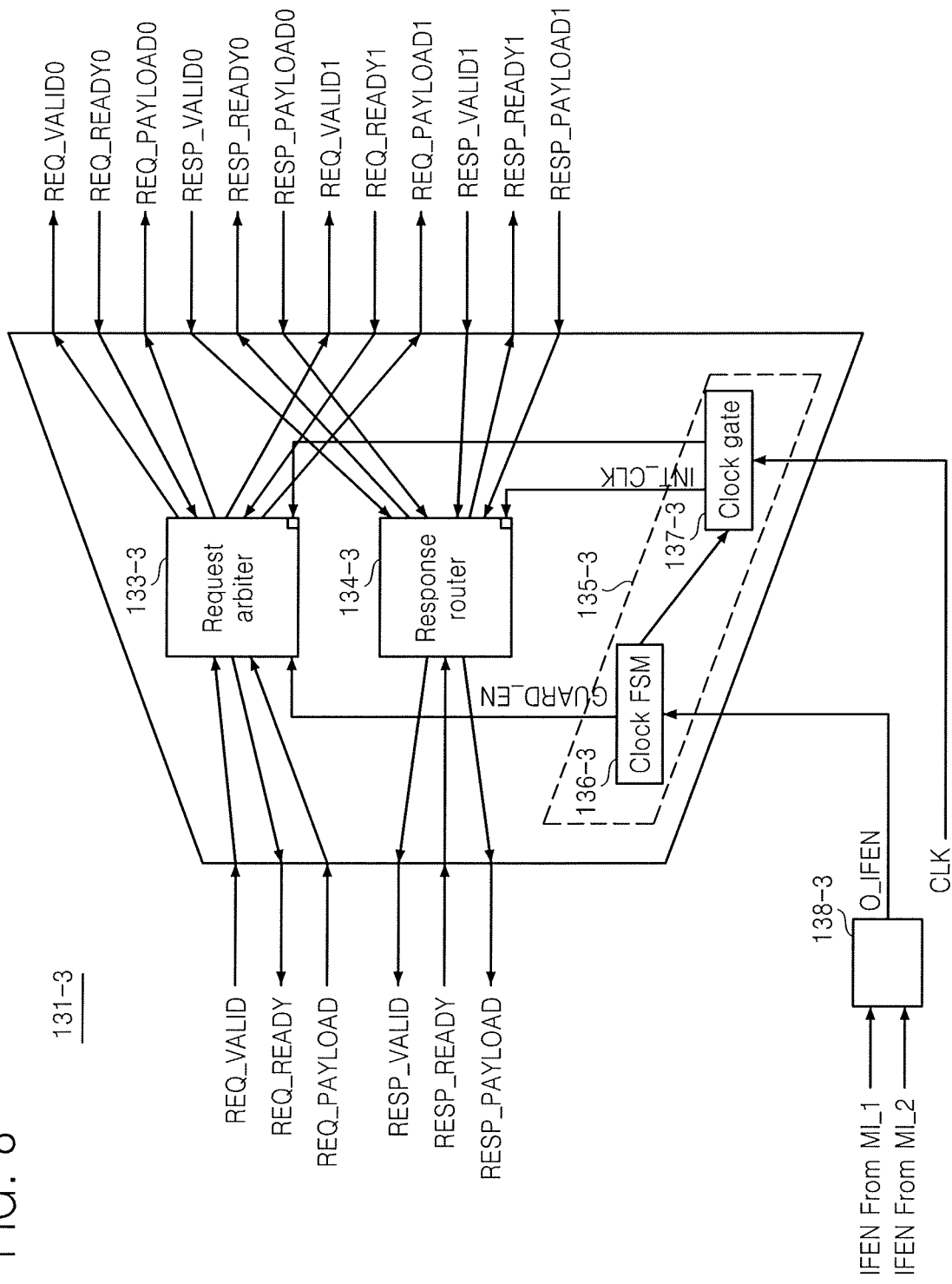
FIG. 8 is a block diagram which shows an exemplary embodiment of a component included in the interface circuit shown in FIGS. 2 and 3.

FIG. 8 is a block diagram which shows an exemplary embodiment of a component included in the interface circuit shown in FIGS. 2 and 3. A component 131-3 shown in FIG. 8 shows an exemplary embodiment of the 1-to-2 switch. Referring to FIGS. 2, 7, and 8, a clock gating block 135-3 and an OR operation block 138-3 are substantially the same as or similar to the clock gating block 135-1 and the OR operation block 138-1 shown in FIG. 7.

Functions of a request arbiter 133-3 and a response router 134-3 shown in FIG. 8 are substantially the same as or similar to functions of the request arbiter 133-1 and the response router 134-1 shown in FIG. 7.

The request arbiter 133-3 may output a first request valid signal REQ_VALID0 to a first next component, e.g., 131-4, among next components 131-4 and 131-8 according to a target slave interface (e.g., the first slave interface SI_1) for a request REQ, and output the first request payload REQ_PAYLOAD0 to the first next component 131-4 when a first request ready signal REQ_READY0 is received from the first next component 131-4. The first request payload REQ_PAYLOAD0 may be a request payload REQ_PAYLOAD transmitted from a previous component 131-2 to a component 131-3.

The response router 134-3 may receive a first response valid signal RESP_VALID0 from the first next component 131-4, and output the first response ready signal RESP_READY0 to the first next component 131-4. The first next component 131-4 may transmit a first response payload RESP_PAYLOAD0 to the component 131-3 in response to the first response ready signal RESP_READY0. The response router 134-3 may receive a second response valid signal RESP_VALID1 from the second next component 131-8 and output a second response ready signal RESP_READY1 to the second next component 131-8. The second next component 131-8 may transmit a second response payload RESP_PAYLOAD1 to the component 131-3 in response to the second response ready signal RESP_READY1.

The response router 134-3 may output a response valid signal RESP_VALID to the previous component 131-2 of the component 131-3, and output a response payload RESP_PAYLOAD to the previous component 131-2 when a response ready signal RESP_READY is received from the previous component 131-2. The response payload RESP_PAYLOAD may be a first response payload RESP_PAYLOAD0 or a second response payload RESP_PAYLOAD1.

Figure 9:
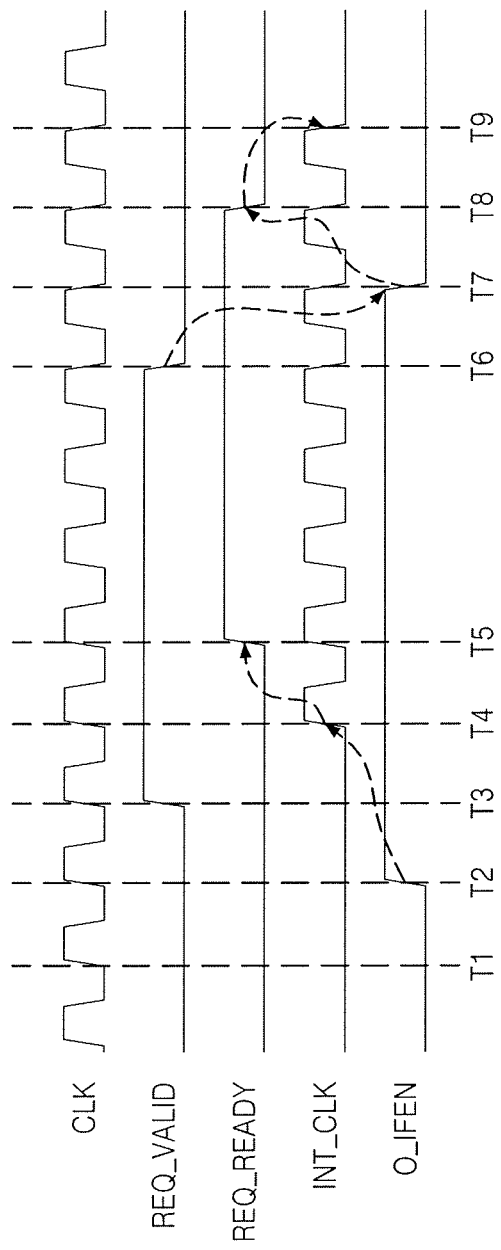
FIG. 9 is a timing diagram which shows an operation of the component shown in FIG. 8.

FIG. 9 is a timing diagram which shows an operation of the component shown in FIG. 8. Referring to FIGS. 2, 8, and 9, since there is no request at a first time point T1, the inactivated component enable signal O_IFEN is output. Accordingly, the component 131-3 maintains a disabled state without a supply of the internal clock INT_CLK.

At a second time point T2, the OR operation block 138-3 outputs the activated component enable signal O_IFEN in response to an activated interface enable signal IFEN output from the first master interface MI_1. At a third time point T3, the component 131-3 receives an activated request valid signal REQ_VALID from the previous component 131-2 on a first signal path PATH1.

At a fourth time point T4, the component 131-3 is provided with the internal clock INT_CLK in response to the activated component enable signal O_IFEN. At a fifth time point T5, the component 131-3 is enabled when the internal clock INT_CLK is supplied. The component 131-3 may receive a request payload REQ_PAYLOAD after being enabled, such that the component 131-3 outputs an activated request ready signal REQ_READY to the previous component 131-2. The previous component 131-2 which receives the activated request ready signal REQ_READY may transmit a request payload REQ_PAYLOAD to the component 131-3.

At a sixth time point T6, when a response payload RESP_PAYLOAD depending on a request payload REQ_PAYLOAD is transmitted to the first master interface MI_1, the previous component 131-2 outputs an inactivated request valid signal REQ_VALID. At a seventh time point T7, when the inactivated request valid signal REQ_VALID is output, the first master interface MI_1 outputs an inactivated interface enable signal IFEN so as to disable the component 131-3. The OR operation block 138-3 may output the inactivated component enable signal O_IFEN in response to the inactivated interface enable signal IFEN.

At an eighth time point T8, before the component 131-3 is disabled, the component 131-3 outputs an inactivated request ready signal REQ_READY in response to the inactivated component enable signal O_IFEN. At a ninth time point T9, when the internal clock INT_CLK is no longer provided, the component 131-3 is disabled. An exemplary embodiment of an operation of the component 131-3 shown in FIG. 9 may be applied to other components 131-1 to 131-2, and 131-4 to 131-*k* substantially in the same manner.

Figure 10:
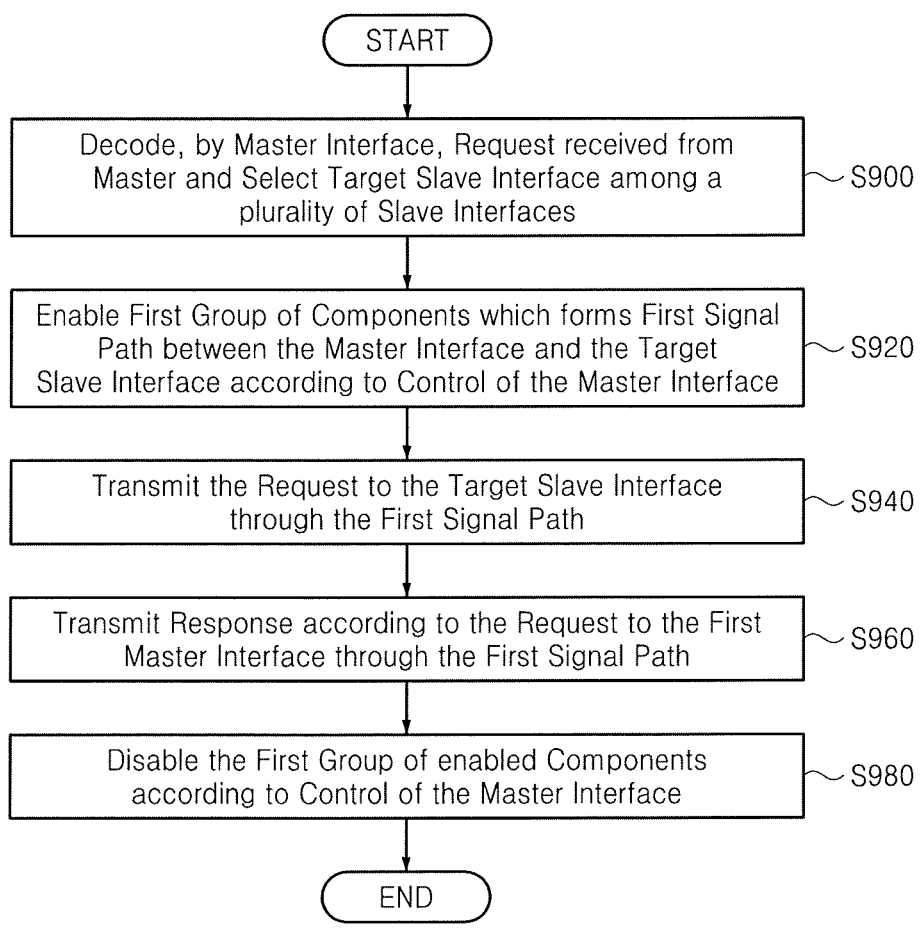
FIG. 10 is a flowchart which shows a method of operating an SoC according to an exemplary embodiment of the present inventive concept.

FIG. 10 is a flowchart which shows a method of operating an SoC according to an exemplary embodiment of the present inventive concept. Referring to FIGS. 1, 2, 4, 5, and 10, a master interface (e.g., the first master interface MI_1) decodes a request REQ received from a master (e.g., a first master 200-1), and select a target slave interface (e.g., a first slave interface SI_1) among a plurality of slave interfaces (e.g., a first and a second slave interfaces SI_1 to SI_2) which can be connected to the first master interface MI_1 according to a result of the decoding (S900).

A first group of components (e.g., 131-1 to 131-4) present in the first signal path (e.g., PATH1) formed between a pair of the first master interface MI_1 and the target slave interface SI_1 is enabled according to a control of the first master interface MI_1.

An interface enable signal generator 120A included in the first master interface MI_1 outputs a plurality of activated interface enable signals IFENs so as to enable the first group of components 131-1 to 131-4. A clock gating block 135 included in each of the first group of components 131-1 to 131-4 supplies the internal clock INT_CLK to each component in response to a corresponding one of the plurality of activated interface enable signals. Each of the first group of components 131-1 to 131-4 may be enabled according to the internal clock INT_CLK which is supplied.

The first group of components 131-1 to 131-4 is enabled, and thereby the first signal path PATH1 is activated and a request REQ is transmitted to the target slave interface SI_1 through an activated first signal path PATH1 (S940). The target slave interface SI_1 transmits the request REQ to a target slave 300-1. The target slave 300-1 which receives the request REQ transmits a response RESP for the request REQ to the target slave interface SI_1, and the target slave interface SI_1 transmits the response RESP to the first master interface MI_1 through the first activated signal path PATH1 (S960).

The first master interface MI_1 transmit a received response RESP to the first master 200-1, and disables the first group of components 131-1 to 131-4 which are enabled (S980). When the first group of components 131-1 to 131-4 are disabled, the first signal path PATH1 is inactivated.

According to an exemplary embodiment, some of the first group of components 131-1 to 131-4 are shared with the first signal path PATH1 and at least one of the other signal paths. When the first master interface MI_1 is set to disable the first group of components 131-1 to 131-4, and the at least one signal path which shares some of the components is in an activated state, these shared components are not disabled. For example, if component 131-3 is the only shared component among components 131-1 to 131-4 by the first signal path PATH1 and a second signal path, and the second path is in the activated state, the first master interface MI_1 will only disable components 131-1, 131-2 and 131-4.

Figure 11:
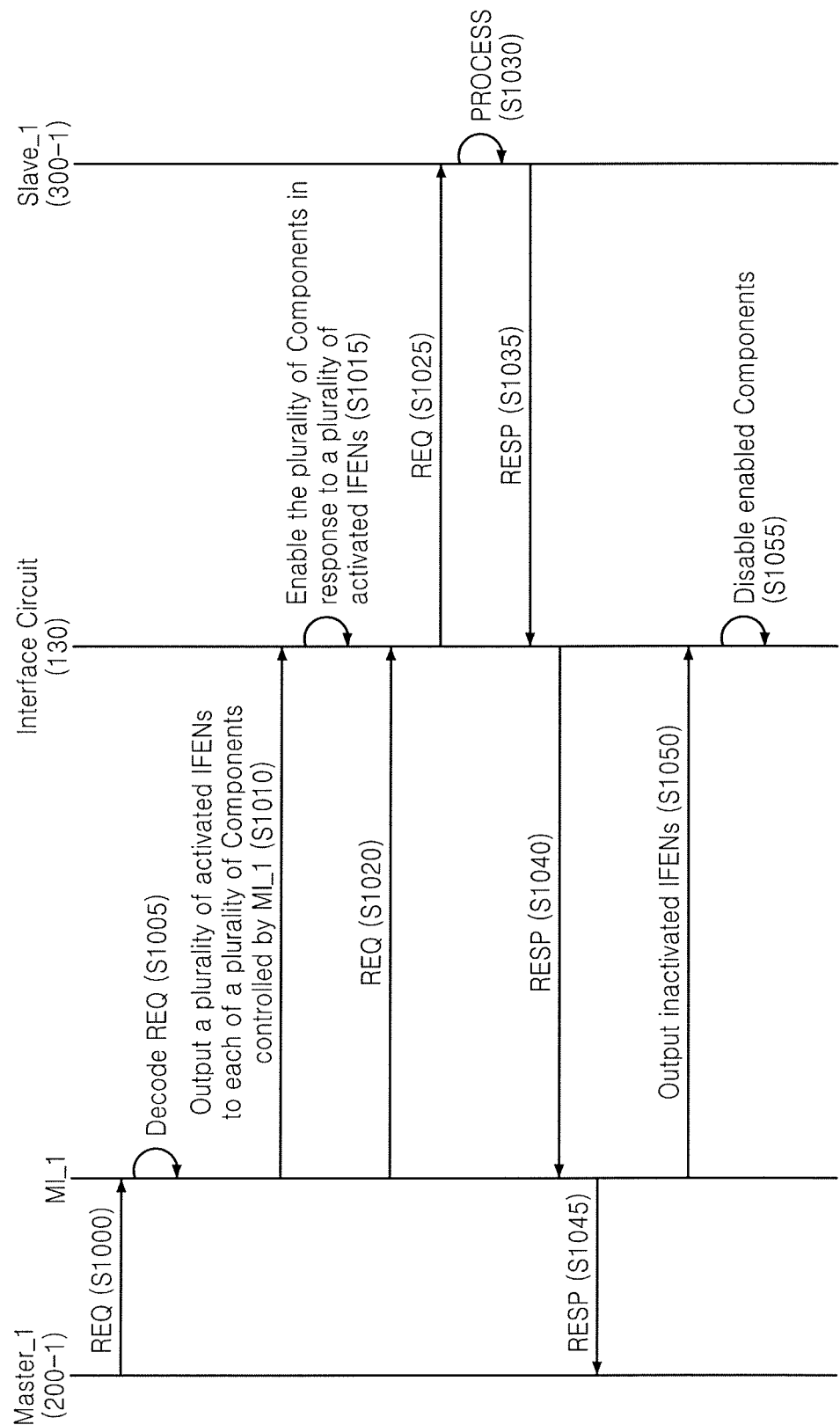
FIG. 11 is a flowchart which shows a method of operating an SoC according to an exemplary embodiment of the present inventive concept.

FIG. 11 is a flowchart which shows a method of operating an SoC according to an exemplary embodiment of the present inventive concept. Referring to FIGS. 1, 2, 4, and 11, the first master 200-1 transmits a request REQ to the first master interface MI_1 (S1000). A decoding block 112 of the first master interface MI_1 decodes the request REQ (S1005), and generates information on the request REQ using a routing table 114 when a target slave (e.g., 300-1) is determined according to a result of the decoding. The information may be information on the first group of components 131-1 to 131-4 which forms the first signal path PATH1 between the pair of the target slave interface (e.g., SI_1) for the request REQ and the first master interface MI_1.

The IFEN generator 120A outputs each of the activated interface enable signals IFENs to each of the first group of components 131-1 to 131-4 using the information (S1010).

The first signal path PATH1 is activated after each of the first group of components 131-1 to 131-4 is enabled in response to a corresponding one of the activated interface enable signals IFENs (S1015), and the first master interface MI_1 transmits the request REQ to the target slave interface SI_1 or to the target slave 300-1 through the first signal path PATH1 which is activated (S1020 to S1025).

The target slave 300-1 processes a received request REQ (S1030), and transmits a response RESP generated according to a result of the processing to the first master interface MI_1 through the first signal path PATH1 which is activated (S1035 to S1040).

The first master interface MI_1 transmits a received response RESP to the first master 200-1 (S1045). The IFEN generator 120B outputs inactivated interface enable signals IFENs to the first group of components 131-1 to 131-4 so as to disable the first group of components 131-1 to 131-4 which are enabled (S1050). The first group of components 131-1 to 131-4 which are enabled are disabled in response to a corresponding one of the inactivated interface enable signals IFENs, and the first signal path PATH1 is inactivated (S1055).

FIG. 12 is a flowchart which shows a method of operating an SoC according to an exemplary embodiment of the present inventive concept. Referring to FIGS. 1, 2, 5, and 12, the first master 200-1 transmits a request REQ to the first master interface MI_1 (S1100). A decoding block 112 of the first master interface MI_1 decodes the request (S1105), and generates information on the request REQ using the routing table 114 and stores generated information in the request table 118 when the target slave (e.g., 300-1) is determined according to a result of the decoding, (S1110). The information may be information on the first group of components 131-1 to 131-4 which forms the first signal path PATH1 between the pair of the target slave interface (e.g., SI_1) for the request REQ and the first master interface MI_1.

The interface enable signal generator 120B outputs the activated interface enable signals IFENs to the first group of components 131-1 to 131-4 using the information stored in the request table 118 (S1115).

When the first signal path PATH1 is activated when the first group of components 131-1 to 131-4 is enabled in response to a corresponding one of the activated interface enable signals IFENs (S1120), the first master interface MI_1 transmits the request REQ to the target slave 300-1 through the first signal path PATH1 (S1125 to S1130).

The target slave 300-1 processes a received request REQ (S1135), and transmits a response RESP generated according to a result of the processing to the first master interface MI_1 through the first signal path PATH1 which is activated (S1140 to S1145). The first master interface MI_1 transmits a received response RESP to the first master 200-1 (S1150), and erases the information on the request REQ stored in the request table 118 (S1155).

The interface enable signal generator 120B outputs the inactivated interface enable signals IFENs to the first group of components 131-1 to 131-4 as the information is erased so as to disable the first group of components 131-1 to 131-4 which are enabled (S1160). The first group of components 131-1 to 131-4 which are enabled are disabled in response to a corresponding one of the inactivated interface enable signals IFENs, and the first signal path PATH1 are inactivated (S1165).

For convenience of description in FIGS. 10 to 12, only a step of processing one request REQ is shown; however, several requests in the SoC 10 may be processed in a parallel manner, such that each of steps shown in FIGS. 10 to 12 is performed corresponding to each of the requests in a parallel manner.

FIG. 13 is a block diagram which shows an exemplary embodiment of an electronic system according to an exemplary embodiment of the present inventive concept. Referring to FIGS. 1 and 13, an electronic system 1200, 1300, 1400, or 1500 may be embodied in a personal computer (PC), a data server, or a portable (or mobile) electronic device. The portable (or mobile) electronic device may be embodied in a mobile phone, a smart phone, a tablet PC, a laptop computer, a personal digital assistant (PDA), an enterprise digital assistant (EDA), a digital still camera, a digital video camera, a portable multimedia player (PMP), a personal navigation device or portable navigation device (PND), a handheld game console, an e-book reader, or a wearable device.

The electronic system 1200, 1300, 1400, or 1500 includes a processor 1210, a power source 1220, a storage device 1230, a memory 1240, input/output ports 1250, an expansion card 1260, a network device 1270, and a display 1280. According to an exemplary embodiment, the electronic system 1200, 1300, 1400, or 1500 further includes a camera module 1290. In an exemplary embodiment, the memory 1240 is the above-described 3D memory array.

The processor 1210 refers to the SoC 10 shown in FIG. 1. For example, the processor 1210 may be embodied by the SoC 10. The processor 1210 may be a multi-core processor. The processor 1210 may include a plurality of controllers which control an operation of each of elements 1210 to 1280. Each of the plurality of controllers may be one of the plurality of masters 200-1 to 200-m, or may be one of a plurality of slaves 300-1 to 300-n shown in FIG. 1.

The power source 1220 may supply an operation voltage to at least one of the elements 1210 to 1280. The storage device 1230 may be embodied by a hard disk drive or a solid state drive (SSD).

The memory 1240 may be embodied by a volatile memory or a non-volatile memory. According to an exemplary embodiment, a memory controller which can control a data access operation, e.g., a read operation, a write operation (or program operation), or an erase operation, for the memory 1240 is integrated or embedded into the processor 1210. According to another exemplary embodiment, the memory controller is located between the processor 1210 and the memory 1240.

The input/output ports 1250 refer to ports which can transmit data to the electronic system 1200, 1300, 1400, or 1500, or transmit data output from the electronic system 1200, 1300, 1400, or 1500 to an external device. For example, the input/output ports 1250 may be a port for connecting a pointing device such as a computer mouse, a port for connecting a printer, or a port for connecting a USB drive.

The expansion card 1260 may be embodied in a secure digital (SD) card or a multimedia card (MMC). According to an exemplary embodiment, the expansion card 1260 may be a subscriber identification module (SIM) card or a universal subscriber identity Module (USIM) card. The network device 1270 refers to a device which can connect the electronic system 1200, 1300, 1400, or 1500 to a wired network or a wireless network.

The display 1280 may display data output from the storage device 1230, the memory 1240, the input/output ports 1250, the expansion card 1260, or the network device 1270. The camera module 1290 refers to a module which can convert an optical image into an electrical image. Accordingly, an electrical image output from the camera module 1290 may be stored in the storage device 1230, the memory 1240, or the expansion card 1260. Moreover, the electrical image output from the camera module 1290 may be displayed through the display 1280.

An SoC according to an exemplary embodiment of the present inventive concept selectively activates only at least one signal path among a plurality of signal paths formed between the master interface and each of a plurality of slave interfaces, and does not activate the rest of the signal paths, thereby reducing power consumed in the SoC.

Although a few embodiments of the present inventive concept have been shown and described, it will be appreciated by those skilled in the art that changes may be made in these embodiments without departing from the principles and spirit of the inventive concept.

What is claimed is:

1. A system on chip (SoC) comprising:
a plurality of master interfaces;
a plurality of slave interfaces; and
an interface circuit including a plurality of paths configured to connect between the plurality of master interfaces and the plurality of slave interfaces, and includes a plurality of components,
wherein, when a first master interface among the plurality of master interfaces and a first slave interface among the plurality of slave interfaces are paired, a first group of the components which forms a first signal path among the plurality of paths between the first master interface and the first slave interface is enabled according to a first request of the first master interface,
wherein the first group of components are enabled according to a control of the first master interface before the first request is transmitted to the first slave interface.

2. The SoC of claim 1, wherein the first slave interface transmits a first response from a first slave to the first master interface through the first signal path in response to the first request.

3. The SoC of claim 2, wherein the first group of enabled components are disabled according to a control of the first master interface after the first response is transmitted to the first master interface.

4. The SoC of claim 1, wherein, when the first master interface and a second slave interface among the plurality of slave interfaces are paired, a second group of the components which forms a second signal path between the first master interface and the second slave interface among the plurality of components is enabled according to a control of the first master interface.

5. The SoC of claim 4, wherein the first master interface selects the second slave interface according to a second request transmitted from the first master interface.

6. The SoC of claim 4, wherein some of the first group of components are shared by the first signal path and the second signal path.

7. The SoC of claim 1, further comprising a clock signal generator which supplies a corresponding clock signal to each of the first group of components.

8. The SoC of claim 1, wherein the first master interface includes an enable signal generator which generates each of a plurality of enable signals for enabling each of the first group of components.

9. The SoC of claim 8, wherein the first master interface further includes a memory,
the first master interface decodes the first request transmitted from the first master interface, generates information on the first group of components which forms the first signal path according to a result of the decoding, and stores the generated information in the memory, and
the enable signal generator generates the enable signals according to the generated information stored in the memory.

10. The SoC of claim 1, wherein each of the plurality of components is one of an M-to-1 switch circuit, a 1-to-N switch circuit, and a bridge circuit, and M and N are natural numbers greater than one.

11. A method of operating a system on chip (SoC) which is connected between a plurality of master interfaces and a plurality of slave interfaces, and comprises an interface circuit including a plurality of components, the method comprising:
receiving, by a first master interface among the plurality of master interfaces, a first request from a master;
decoding, by the first master interface, the received first request, and enabling a first group of components among the plurality of components present in a first signal path formed between a first slave interface selected among the plurality of slave interfaces and the first master interface according to a result of the decoding; and
transmitting, by the first master interface, the first request to the first slave interface through the first signal path,
wherein the first master interface selects the first slave interface according to the first request transmitted from the master, and
wherein the first group of components are enabled according to a control of the first master interface before the first request is transmitted to the first slave interface.

12. The method of operating a system on chip (SoC) of claim 11, wherein the enabling comprises:
generating, by the first master interface, a plurality of enable signals for enabling each of the first group of components;
outputting, by the first master interface, the enable signals to the first group of components; and
enabling each of the first group of components when a clock signal is received by each component.

13. The method of operating an SoC of claim 11, further comprising transmitting, by the first slave interface, a first response transmitted from a first slave to the first aster interface through the first signal path in response to the first request.

14. The method of operating an SoC of claim 13, further comprising disabling each of the first group of enabled components according to a control of the first master interface after the first response is transmitted to the first master interface.

15. A system on chip (SoC) comprising:
a plurality of master interfaces;
a plurality of slave interfaces; and
an interface circuit including a plurality of paths configured to connect between the plurality of master interfaces and the plurality of slave interfaces, and includes a plurality of components,
wherein a first master device among the master interfaces is configured to form a first signal path among the plurality of paths comprising a first group of the components between the first master device and a first slave interface among the slave interfaces, and
wherein the first master device disables the components of the first group that are not shared by a second signal path prior to the SoC forming the second signal path between one of the master interfaces and one of the slave interfaces.

16. The SoC of claim 15, wherein the SoC includes a table that stores a first entry associated with a first request and identifying the components within the first signal path and a second entry associated with a second request and identifying the components within the second signal path, and the SoC deletes the first entry after a response to the first request has been received.

17. The SoC of claim 16, wherein each entry further identifies at east one of the slave interfaces.

18. The SoC of claim 15, wherein each component in the first group comprises:
an arbitration circuit configured to manage output of a request from the first master interface to another one of the components in the first group or to one of the slave interfaces in response to an internal clock signal; and
a routing circuit configured to manage output of a response to the request to another one of the components in the first group or to the first master interface in response to the internal clock signal.

* * * * *